United States Patent [19]
Holmes

[11] 3,934,941
[45] Jan. 27, 1976

[54] SKID CONTROL VALVE

[75] Inventor: Lloyd H. Holmes, Salt Lake City, Utah

[73] Assignee: E-Systems, Inc., Dallas, Tex.

[22] Filed: Dec. 23, 1974

[21] Appl. No.: 535,994

[52] U.S. Cl. .................................. 303/21 F; 303/10
[51] Int. Cl.² ......................................... B60T 8/12
[58] Field of Search ... 303/10, 21 F, 21 CG, 21 CE, 303/61; 188/181 A

[56] References Cited
UNITED STATES PATENTS

| | | | |
|---|---|---|---|
| 3,514,161 | 5/1970 | Frayer | 303/21 F |
| 3,544,171 | 12/1970 | Lester et al. | 303/21 F |
| 3,635,531 | 1/1972 | Okamoto et al. | 303/21 CG |

Primary Examiner—Duane A. Reger
Attorney, Agent, or Firm—Robert V. Wilder

[57] ABSTRACT

A valve device includes primary and secondary fluid systems. The secondary fluid system includes source pressure and controlled pressure channels containing secondary fluid at source and controlled pressures, respectively. A master cylinder primary fluid source is connected through first and second parallel paths to a primary fluid portion of a changeover cavity which is also connected to the brake cylinders of a vehicle. The changeover cavity includes primary and secondary movable piston member therein, separating primary and secondary fluid portions thereof. Each parallel primary path includes a valve member for controlling the flow of primary fluid to the primary portion of the changeover cavity. The first primary valve member is mechanically operated by the primary movable piston member and the second primary valve member is operated by a blockout piston in the secondary fluid system which is responsive to the difference in pressure between the secondary source pressure and the controlled pressure of the secondary fluid. A secondary source pressure failure valve allows the pressure-controlled secondary fluid to pass into the secondary portion of the changeover cavity to control the position of the first and second movable piston members within the changeover cavity. The secondary source pressure failure valve is operable to isolate the secondary fluid in the secondary portion of the changeover cavity when the pressure of the secondary fluid source falls below a predetermined value. A control valve in the secondary fluid system is operated by a solenoid to block a normally open passage from the secondary fluid source to the controlled-pressure channels and open a passage from the controlled pressure channels to a low-pressure return port in response to an electrical signal indicative of a predetermined external condition.

12 Claims, 3 Drawing Figures

SKID CONTROL VALVE

FIELD OF THE INVENTION

The present invention relates generally to skid control apparatus, and more particularly to a hydraulic skid control valve for cyclically regulating the pressure applied to a brake system upon sensing of a potential skid condition.

BACKGROUND OF THE INVENTION

It has long been recognized that if a vehicle entering a skid has the brakes cyclically applied there is a significantly improved chance of maintaining control of the vehicle. For many years the recommendation to the motoring public and professional drivers was that if their vehicle enters a skid, the brakes should be "pumped" to improve chances of maintaining control of the vehicle. This "pumping" action is intended to provide a cyclic application of fluid pressure to the individual wheel brake actuators. The more skilled professional driver, after becoming familiar with the peculiarities of his vehicle, was able to significantly reduce the chances of losing control of the vehicle during a skid condition. For the motoring public in general, and professional drivers not accustomed to a particular vehicle, the manually-controlled pumping procedure may produce an aggravated skid condition resulting in a complete loss of vehicle control.

Heretofore, prior art skid control valves have been provided which relieve a vehicle operator of the responsibility of properly applying cyclic pressure to a vehicle brake system in a skid condition. The prior art devices, upon sensing a skid condition, are cyclically operated to produce a pumping action application of fluid pressure to the individual wheel brake actuators. The cyclic pressure is applied to the wheel brake actuators for an axle so long as the skid condition exists. While prior art devices have generally been satisfactory, there still exists a need for improvement in several respects. The majority of prior art devices include various moving elements thereof which interface with both the primary or master cylinder fluid as well as the secondary fluid. Although sealing devices have heretofore been employed in such moving components to separate primary and secondary fluids, those sealing devices have proven ineffective over a period of time to isolate the primary and secondary fluids. When both the primary and secondary fluids act on the same sealing device, deterioration of that sealing element has heretofore been unavoidable. Further, adverse effects on the skid control apparatus as a whole will result due to the leakage of primary fluid into the secondary fluid system and vice versa. Moreover, with valves having moving members therein in liquid contact with more than one type of fluid, it is impossible to replace a moving part without involving both fluid systems. Therefore, there is a need for a skid control valve in which each moving member is in fluid contact with only one of the system fluids.

In the operation of some prior art devices, once an operator engages the brake and a skid condition is sensed, the operator is locked out of the system until the skid condition is corrected. That operation is not desirable in all situations. For example, should an operator engage the brake while traveling over a patch of ice, the force he applies to the brake pedal will be relatively light. If, after the skid control device becomes operative, the vehicle passes over the patch of ice and encounters dry pavement on which a greater braking force is required, the operator would be unable to effect the necessary increase in brake pressure until the anti-skid mechanism terminates its operation and the fluid path from the master cylinder to the wheel cylinder is reopened. Thus, there is a need for an anti-skid valve apparatus which provides the pumping effect required to overcome the skid, but at the same time allows the vehicle operator to reenter the operation when a greater wheel cylinder pressure is required.

Further, if for any reason the secondary fluid source does not provide sufficient secondary fluid pressure, the anti-skid device will not function properly. In those situations it is desirable to maintain the operation of the primary fluid system without the encumbrance of a non-functional secondary fluid system. Therefore, there is a need for an improved anti-skid valve apparatus which includes a device responsive to the pressure of the secondary fluid source to isolate the secondary fluid system from the skid control valve whenever the secondary fluid source pressure is below a predetermined value.

SUMMARY OF THE INVENTION

It is therefore an object of the present invention to provide an anti-skid control apparatus which fulfills the foregoing needs.

It is another object of the present invention to provide an anti-skid control apparatus including separate but interacting primary and secondary fluid systems in which every moving element contained therein is in liquid communication with only one of the fluids.

It is a further object of the present invention to provide an anti-skid control apparatus as set forth which effectively isolates the secondary fluid system when the pressure of the secondary fluid source is below a predetermined value.

It is still another object of the present invention to provide an anti-skid control apparatus as set forth which, upon detection of a skid condition, effectively blocks out the vehicle operator and automatically provides maximum deceleration of the vehicle without skidding.

It is yet another object of the present invention to provide an anti-skid control apparatus as set forth and which further allows the vehicle operator to provide additional primary fluid brake pressure to the wheel cylinders of the vehicle in the event that the automatic skid control operation is insufficient to provide maximum deceleration of the vehicle.

In accomplishing these and other objects, there has been provided, in accordance with the present invention, an anti-skid control apparatus which includes a primary fluid system operable to apply primary fluid pressure from a master cylinder to the brake cylinders of the wheels of a vehicle. The anti-skid control apparatus further includes a secondary fluid system operable, in conjunction with the primary fluid system, to block out the primary fluid flow from the master cylinder and control the primary fluid pressure applied to the brake cylinders in response to a detected skid condition. The apparatus includes means for fluidically isolating the primary and secondary fluid systems so that every movable member of the apparatus is in fluid communication with only one of the fluids. The secondary fluid system also includes a secondary low pressure valve responsive to the detection of a predetermined low pressure at the secondary fluid source to effectively terminate the control function of the secondary fluid system allowing the fluid pressure at the wheel cylinders to be determined solely by the pressure generated at the master cylinder. Means are also provided to interrupt the automatic skid control operation and allow the vehicle operator to apply a greater pressure to the wheel cylinders to effect maximum deceleration of the vehicle.

BRIEF DESCRIPTION OF THE DRAWINGS

A better understanding of the present invention may be had from the following description when read in connection with the accompanying drawings in which.

DETAILED DESCRIPTION OF THE PREFERRED EMBODIMENT

Figure 1:
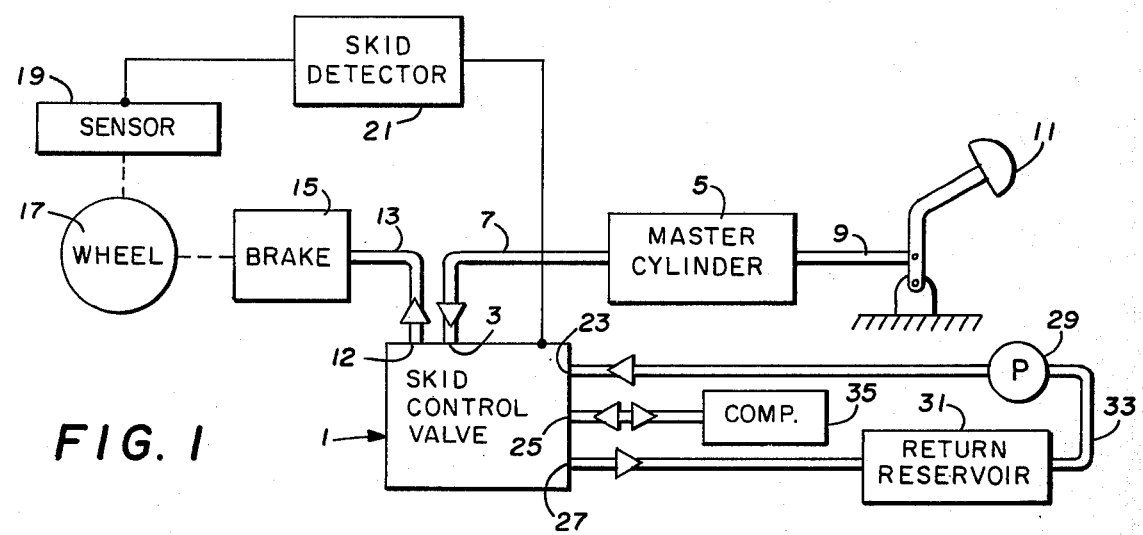
FIG. 1 is a schematic diagram of an anti-skid control system utilizing an exemplary embodiment of the present invention.

Referring to FIG. 1 in detail, there is shown an anti-skid control system including a skid control valve 1 having a port 3 connected to a master cylinder 5 by means of a conduit 7. Typically, the master cylinder 5 is of the type usually found in vehicles to develop a hydraulic pressure in the conduit 7 in response to a mechanical force developed on a rod 9 which is pivotally connected to a brake pedal 11.

In normal operation of the skid control valve 1, hydraulic fluid under pressure in the conduit 7 passes through the valve 1 by way of ports 3 and 12 and into a conduit 13 which terminates at the wheel brake cylinders 15. The individual brake actuators of the wheel cylinders 15 exert a braking action on the wheel 17 in a conventional manner wherein hydraulic pressure applied to the actuator expands brake shoes in contact with a brake drum for effecting a braking action of the vehicle. A sensor 19 is coupled to the wheel 17 and generates an electrical output signal representative of the velocity of the wheel. The output signal is applied to a skid detector circuit 21 which processes the sensor output signal to provide a skid condition signal for application to the skid control valve 1.

The skid control valve 1 also includes ports 23, 25 and 27 which are internally connected to the secondary fluid system. A cyclic pump 29 provides secondary fluid at a secondary source pressure to port 23. Port 27 provides a low pressure return to a return reservoir 31 for the secondary fluid system. The return reservoir 31 is connected to the cyclic pump 29 by means of the conduit 33. Port 25 of the skid control valve 1 may be connected to a compensating device 35 for adjusting the secondary fluid pressure within the skid control valve 1.

Figure 2:
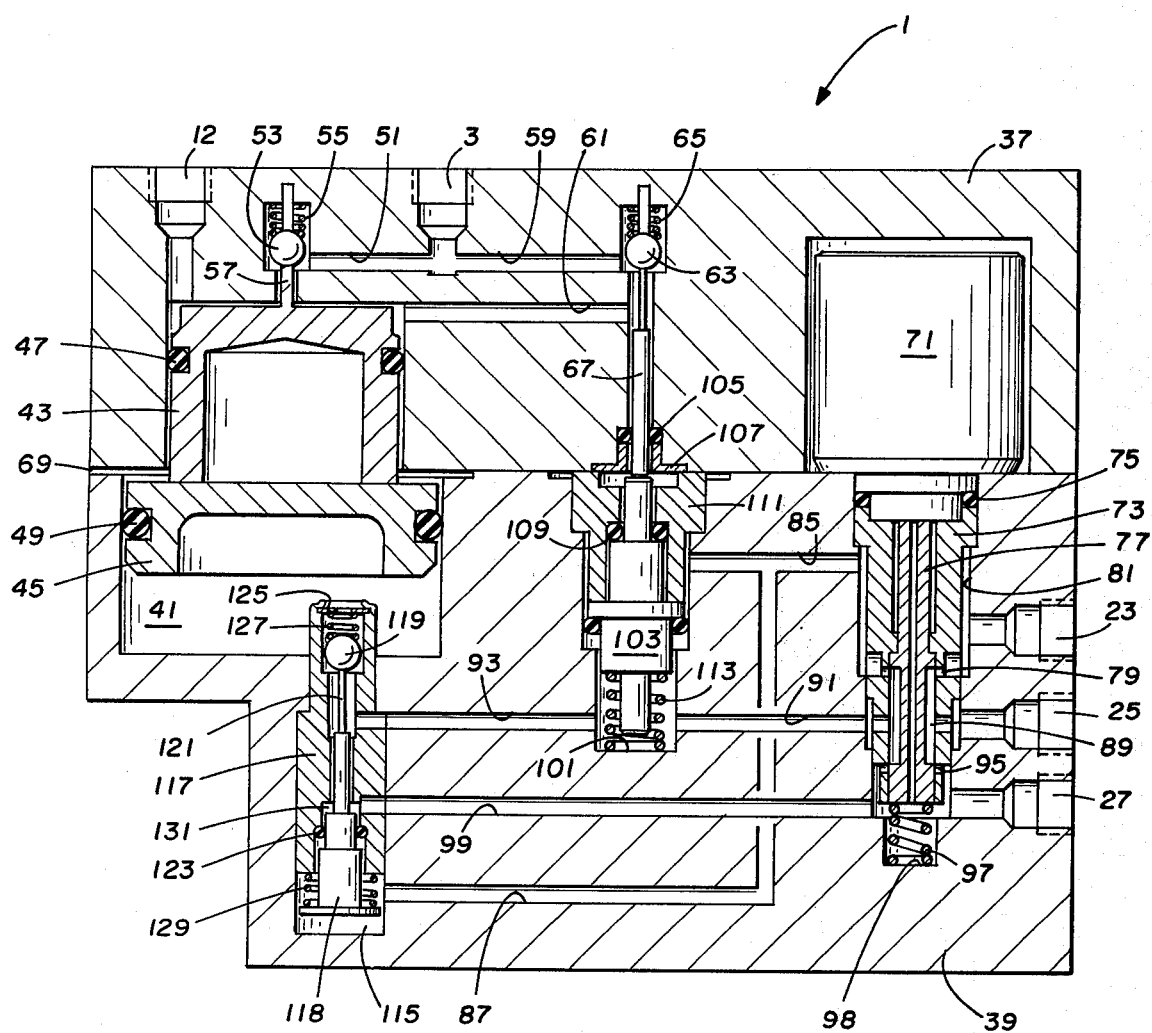
FIG. 2 is a cross-sectional view of the anti-skid control apparatus with the elements thereof in typical positions when no skid condition is detected.

In FIG. 2, the valve apparatus 1 includes a primary housing 37 and a secondary housing 39 which have a common interface therebetween. The primary and secondary housings together define a changeover cavity 41. The primary fluid input port 3 is connected to first and second parallel paths leading to the changeover cavity 41. The changeover cavity 41 includes a first or primary movable piston member 43 and a second or secondary movable piston member 45 therein. Sealing elements 47 and 49 seal the primary fluid from the second movable piston member 45 and the secondary fluid from the first movable piston member 43, respectively. The first and second movable piston members are separate and distinct elements although they are arranged for mechanical coupling at a common interface. The first and second movable piston members may be hollowed out as indicated. The first and second parallel paths from the primary fluid input port 3 both lead to the upper portion of the upper changeover cavity 41 above the first movable piston member 43. The first parallel path from the port 3 includes the conduit 51 and a ball valve 53. A biasing spring 55 tends to hold the ball valve down against an opening into the upper portion of the changeover cavity 41. An actuating means 57, which, in the present example, is an integral part of the first movable piston member 43, is operable when the first movable piston member 43 is in its extreme upward position, to force the ball valve 53 to its open position thereby overcoming the biasing spring 55. The second parallel path from the port 3 to the upper portion of the changeover cavity 41 includes conduits 59 and 61. Within the second parallel path, there is a second ball valve 63 which is biased to close the second parallel path by a biasing spring 65. A pin member 67 engages the ball valve 63 and is selectively operable to overcome the biasing spring 65 thereby opening the second parallel path from the port 3 to the upper portion of the changeover cavity 41 as will be explained hereinafter in detail. The port 12 provides a passage from the upper portion of the changeover cavity 41 to the brake actuators as shown in FIG. 1.

At the junction of the primary and secondary housings 37 and 39, and between the sealing elements 47 and 49 is a drainage port 69 which is effective to drain any liquid from the area between the seals 47 and 49.

Figure 3:
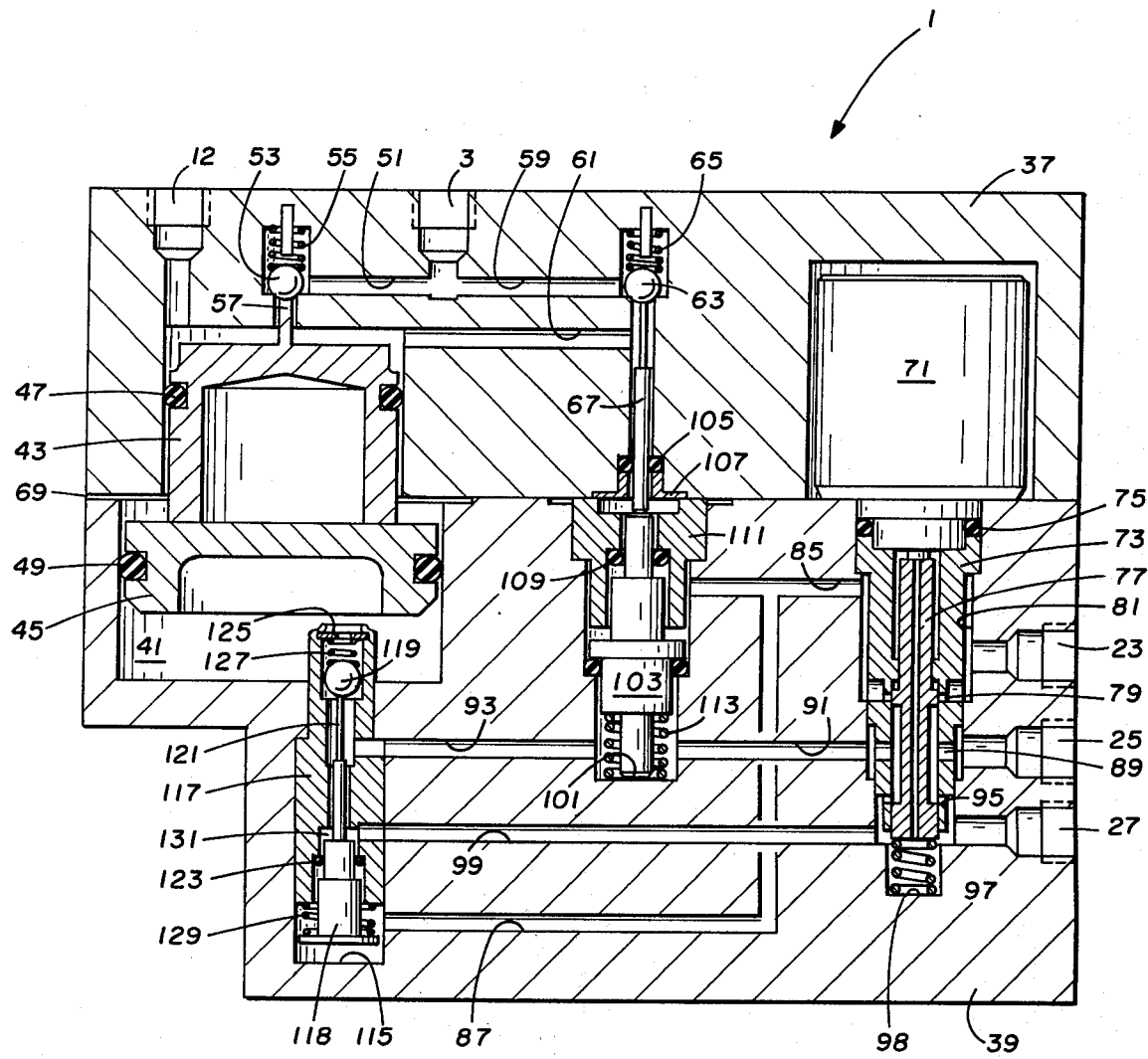
FIG. 3 is a cross-sectional view of the apparatus as shown in FIG. 2 with the elements thereof in typical positions when a skid condition exists.

The skid control apparatus 1 further includes a solenoid 71 which is electrically connected to the skid detector circuit 21 shown in FIG. 1. The solenoid 71 is mechanically coupled to a solenoid valve sleeve 73 which includes a sealing element 75. The solenoid valve sleeve 73 is connected to a solenoid valve slider 77. The solenoid valve sleeve 73 further defines a solenoid pressure orifice 79. The solenoid valve or control valve assembly is included within a control cavity 81. The secondary fluid input port 23 is connected to the control cavity 81 which, in turn, opens into secondary source pressure channels including the conduits 85 and 87. As shown in FIG. 2, the solenoid valve slider 77 also defines a pressure control chamber 89. When the solenoid is unenergized as shown in FIG. 2, the solenoid pressure orifice 79 is open thereby providing a liquid path between the secondary fluid input port 23 and the control chamber 89. The compensation port 25 opens into the control chamber 89 which includes secondary fluid at a controlled pressure for use in a pressure-controlled portion of the secondary fluid system within the skid control apparatus 1. The pressure-controlled secondary fluid is thus furnished through pressurecontrolled conduits 91 and 93. When the solenoid 71 is not energized, the solenoid valve slider 77 is effective to block the control chamber 89 from the return port 27. When the solenoid 71 is energized, the solenoid valve slider 77 moves downwardly to a position as shown in FIG. 3. In that position, the solenoid pressure orifice 79 is closed thereby isolating the control chamber 89 from the upper portion of the control cavity 81 and thus from the source of secondary fluid pressure. Also, the solenoid valve return pressure orifice 95 is opened thereby providing the fluid path between the control chamber 89 and the return port 27 which leads to the low pressure return reservoir 31. The solenoid valve slider 77 is biased into an upward position as shown in FIG. 2 by a biasing spring 97. The return port 27 is connected through a low pressure cavity 98, which includes biasing spring 97, to a conduit 99 leading to a pump failure valve.

The conduit 91 from the control chamber 89 is connected to a blockout cavity 101. The blockout cavity 101 includes therein a driver blockout piston 103. The driver blockout piston 103 is coupled to the pin member 67 included within the primary housing 37. The channel which holds the pin 67 also includes a sealing element 105 and a retainer 107. Another sealing element 109 is connected to a driver blockout piston retainer 111 to provide a seal against the driver blockout piston 103.

The sealing elements 105 and 109 are on primary and secondary sides of an air space at the top of the blockout cavity. That air space may be connected to a drainage channel, similar to the drainage channel 69, to vent any leakage which may be in the volume between the seals 105 and 109. The blockout pistons 103 is biased in its upward position as shown in FIG. 2 by means of the biasing spring 113. The blockout piston 103 divides the blockout cavity 101 into a source pressure portion which is connected to the conduit 85, and a controlled pressure portion which is connected to conduits 91 and 93. The source pressure portion of the blockout cavity will always receive secondary fluid at the source pressure through conduit 85 regardless of whether the solenoid 71 is energized or de-energized. On the other hand, the controlled pressure portion of the blockout cavity 101 will receive secondary fluid at either the source pressure or the controlled pressure through the conduit 91, depending upon whether the solenoid 71 is de-energized or energized, respectively. Typically, when the solenoid 71 is not energized and there is no skid condition detected, the fluid in both conduits 85 and 91 are at the secondary source pressure and the biasing spring 113 biases the blockout piston 103 upwardly thereby forcing the pin member 67 to unseat the ball valve 63 and allow an open passage from the primary fluid input port 3 through conduits 59 and 61, and through the upper portion of the changeover cavity 41 and the port 12 to the wheel cylinders of the vehicle.

The conduits 93, 99 and 87 are all connected to various portions of a secondary pump failure cavity 115. The pump failure cavity 115 includes a pump failure sleeve 117 and a pump failure piston 118. A pin member 121 connects the pump failure piston 118 to a ball valve 119. A sealing element 123 provides a seal between the pump failure sleeve 117 and the pump failure piston 118. The upper portion of the pump failure sleeve 117 holds an open retaining washer 125, allowing liquid passage from the upper portion of the pump failure cavity 115 to the lower or secondary portion of the changeover cavity 41 below the second movable piston member 45. A biasing spring 127 is connected between the retaining washer 125 and the ball valve 119 thereby biasing the ball valve 119 against the pin member 121. Another biasing spring 129 is effective to bias the pump failure piston 118 in a downward direction with respect to the pump failure sleeve 117, thereby closing the passage from the upper portion of the pump failure cavity 115 to the lower or secondary portion of the changeover cavity 41. The conduit 99 is connected to a return pressure portion 131 of the pump failure cavity 115 which is defined by the pump failure piston 118 and the pump failure sleeve 117.

Typically, when the secondary fluid source pressure is above a predetermined value, the secondary fluid entering the pump failure cavity 115 through the conduit 87 will effect an upward force on the lower part of the pump failure piston 118 thereby overcoming the force of the bias spring 129 and forcing the ball valve 119 to an open position as shown in FIG. 2. However, should the secondary fluid source pressure drop below a predetermined value, the upward force exerted on the pump failure piston 118 will be insufficient to overcome the downward force of the biasing spring 129, and the ball valve 119 will close. With the ball valve 119 closed, the secondary fluid is precluded from flowing into the secondary portion of the changeover cavity 41 and the secondary fluid system can not affect the pressure of the primary fluid applied to the wheel cylinders in response to the vehicle operator engaging the brake pedal.

FIG. 3 shows the position of the hereinbefore described elements of the skid control apparatus 1 during a skid condition.

OPERATION

In operation, when the secondary fluid pump 29 is not operational, for example when the vehicle containing the skid control apparatus is not running, no substantial secondary source pressure is introduced into the secondary fluid system. In that situation, since there is no skid condition signal applied to the solenoid 71, the solenoid valve slider 77 is in the position shown in FIG. 2. With the secondary fluid pump inoperative, there is no substantial secondary fluid pressure in the conduits 85 and 87. Therefore, the source fluid pressure applied to the upper portion of the blockout valve 103 through the conduit 85 is insufficient to overcome the force applied to the blockout piston 103 from the biasing spring 113. Consequently, the blockout valve 103 will remain in its upper position as shown in FIG. 2 unseating the ball valve 63 and allowing a free flow of primary fluid from the master cylinder through port 3 and conduits 59 and 61 to the upper portion of the changeover cavity 41 and through the port 12 to the wheel cylinders. The secondary source pressure applied to the lower portion of the pump failure piston 118 will similarly be insufficient to overcome the force exerted on the pump failure piston 118 by the biasing spring 129 and the pump failure piston 118 will be in its lower position in which the ball valve 119 is sealed against the pump failure valve sleeve 117. Thus, secondary fluid in the lower portion of the changeover cavity 41 will be trapped therein. The trapped secondary fluid in the lower changeover cavity 41 will hold the first and second movable piston members 43 and 45 in the positions shown in FIG. 2 causing the actuating means 57 to unseat the ball valve 53 allowing another path for the primary fluid from the master cylinder to flow through the upper portion of the changeover cavity 41 to the wheel cylinders. Thus, when the secondary fluid pump is not operational, the secondary system of the skid control apparatus 1 will not impede the operation of the master cylinder braking system which will function in a normal manner allowing an operator to selectively brake the vehicle.

When the secondary fluid pump is operational, as when the vehicle is running, but if the secondary fluid pump 29 does not provide sufficient pressure to effect the proper operation of the secondary system, the downward force exerted by the biasing spring 129 on the secondary pump failure piston 118 will overcome the pressure applied to the lower portion of the secondary pump failure 118 and the ball valve 119 will close off the flow of secondary fluid to the lower portion of the changeover cavity 41. With the ball valve 119 closed, the secondary fluid system is unable to affect the pressure applied to the wheel cylinders through the primary fluid system as determined by the output pressure of the master cylinder 5. Thus, the pump failure valve is operable to shut off the secondary fluid system from affecting the operation of the primary fluid system when the source pressure of the secondary fluid pump 29 is below a predetermined value. With insufficient secondary fluid source pressure, the biasing spring 113 holds the driver blockout piston 103 in its upward position thereby providing a fluid path from the master cylinder through the input port 3 and the conduit 61 to the wheel cylinders through the port 12.

When sufficient secondary fluid source pressure is being furnished by the secondary fluid pump 29, and no skid condition has been detected, the solenoid valve slider 77 is in the position shown in FIG. 2 providing a fluid path between the secondary source input port 23 and the control chamber 89 of the control cavity. Therefore, the fluid pressure of the secondary fluid in the conduits 91 and 85 are substantially the same. The effect of the fluid passing through the conduits 85 and 91 to the drive blockout cavity 101 on the driver blockout piston 103 is to maintain the blockout piston 103 in its upward position thus unseating the ball valve 63 and providing a fluid path from the master cylinder to the wheel cylinders. Since the secondary fluid pump 29 is providing sufficient pressure above the predetermined value, the secondary fluid flowing through the conduit 87 to the pump failure cavity 115 exerts a pressure on the lower side of the pump failure piston 118 sufficient to overcome the force provided by the biasing spring 129 and the pump failure piston 118 is forced upwardly. The ball valve 119 becomes unseated thus providing a fluid path for the controlled secondary fluid in the control chamber 89 through conduits 91 and 93 and through the open retaining washer 125 to the lower portion of the changeover cavity 41. In that situation, the pressure developed in the lower portion of the changeover cavity 41 is sufficient to hold the second movable piston member 45 in its upward position thus maintaining the first movable piston member 43 in its upward position. The first movable piston member 43 thereby unseats the ball valve 53 through the actuating pin 57 providing another fluid path from the master cylinder to the wheel cylinders. In that situation and until a skid condition is detected, normal braking action continues and the braking force applied to the wheel cylinders is determined solely by the pressure developed in the master cylinder by the vehicle operator. Should the secondary fluid pump 29 fail in this situation for any reason, the ball valve 19 will close trapping the fluid in the lower portion of the changeover cavity 41 as hereinbefore explained and that pump failure operation will not affect the normal operation of the master cylinder braking system.

When the wheel sensor 19 provides a signal indicative of a skid condition, the skid detector circuit 21 will generate a signal to energize the solenoid 71. When the solenoid 71 is energized, the solenoid valve slider 77 is forced downwardly, closing off the control chamber 89 from the secondary fluid source input port 23 and opening a passage from the control chamber 89 to the return port 27 as shown in FIG. 3. That operation does not affect the pressure of the secondary fluid in conduits 85 and 87 since those conduits are directly connected to the secondary source input port 23 around the solenoid valve sleeve 73. Therefore, the downward force exerted on the upper portion of the driver blockout piston 103 and the upward force exerted on the pump failure piston 118 will remain the same as it was before the solenoid 71 was actuated. However, since the source has been cut off from the control chamber 89 and the return has been connected thereto, the fluid pressure of the secondary fluid in conduits 91 and 93 will substantially decrease. The pressure differential acting on the upper and lower portions of the driver blockout piston 103 is effective to drive the blockout piston 103 downwardly and the ball valve 63 closes against the primary housing to block out one of the paths from the master cylinder to the wheel cylinders through conduit 59. Since the upward pressure acting on the pump failure piston 118 remains the same, the ball valve 119 remains open allowing the low pressure secondary fluid to flow from the control chamber 89 through conduits 91 and 93 to the lower portion of the changeover cavity 41. However, the secondary fluid entering the lower portion of the changeover cavity 41 is of a decreased pressure since the pressurized secondary fluid from the pump 29 through the port 23 has been cut off. Accordingly, the upward force exerted by the secondary fluid in the lower portion ot the changeover cavity 41 will decrease and the first and second movable piston members 43 and 45 will slide downwardly as shown in FIG. 3. With the movable piston members 43 and 45 not in their uppermost position, the actuating pin 57 will disengage the ball valve 53 and the ball valve 53 will be allowed to close against the primary housing 37 thereby blocking off the remaining passage from the master cylinder to the wheel cylinder. Therefore, with both ball valves 63 and 53 closed, the vehicle operator is, in effect, shut out of the system and the pressure of the primary fluid applied to the wheel cylinders through the port 12 is controlled by the volume of the upper portion of the changeover cavity 41. That volume is in turn controlled by the secondary fluid pressure exerted upon the second movable piston member 45. As the first and second movable piston members 43 and 45 slide downwardly, the volume of the upper portion of the changeover cavity 41 is increased thereby decreasing the pressure of the primary fluid applied to the wheel cylinders. That effect is the same as would be caused by a vehicle operator releasing his foot pressure against the brake pedal 11 and thus the automatic pumping action is initiated. The effect obtained through the operation of the anti-skid control apparatus 1 is to relieve the pressure applied to the brakes before the wheels become locked and the vehicle skids out of control.

At some point during the downward movement of the first and second movable piston members 43 and 45 the pressure applied to the wheel cylinders will have been sufficiently relieved to allow the speed or velocity of the wheels to approach a predetermined deviation from the velocity of the wheels before the operator engaged the brake pedal 11. At that point, the solenoid 71 will be de-energized and the solenoid valve slider 77 will move to its upward position connecting the port 23 to the control chamber 89 and blocking the connecting from the return port 27 to the control chamber 89. The controlled secondary fluid pressure will then begin to increase and the secondary fluid at that increased pressure flowing through the conduits 91 and 93 to the lower portion of the changeover cavity 41 will cause the first and second movable piston members 43 and 45 to again move upwardly. The upward movement of the first and second movable piston members 43 and 45 will decrease the volume of the upper portion of the changeover cavity 41 and thereby increase the pressure of the primary fluid applied to the wheel cylinders. The wheel cylinders will then realize an increased pressure applied thereto in the same manner as would result from the vehicle operator engaging the brake pedal after having released it in a pumping action.

If, during the upward movement of the first and second movable begin members 43 and 45, and the corresponding increase in primary fluid pressure applied to the wheel cylinders, the sensor 19 detects a decrease in velocity of the wheels beyond a predetermined deviation from a previously sensed wheel velocity, an energization signal would again be generated by the master cylinder circuit 5 to energize the solenoid 71. If that occurs before the first movable piston member 43 has traveled to its uppermost position unseating the ball valve 53, the ball valve 53 and the ball valve 63 will remain closed thereby continuing to block the driver out of the system. After energization of the solenoid 71, the first and second movable piston members 43 and 45 will again begint to slide downwardly and release the pressure applied to the wheel cylinders as hereinbefore explained.

If, during an upward movement of the movable piston members 43 and 45, the decrease in velocity of the wheels does not exceed the predetermined deviation from a previously sensed wheel velocity, no solenoid energization signal will be generated. In that event, the first and second movable piston members 43 and 45 will continue their upward movement until the ball valve 53 is unseated opening a primary fluid passage from the master cylinder to the wheel cylinders through the upper portion of the changeover cavity 41. In that event, the vehicle operator again resumes direct pressure control of the primary fluid pressure applied to the wheel cylinders. When the pressure in the lower portion of the drive blockout cavity 101 exceeds a predetermined level, the driver blockout piston 103 will move upwardly to unseat the ball valve 63 opening the other passage for the primary fluid from the master cylinder to the wheel cylinder. Normal operation of the braking system will then resume until another potential skid condition is sensed and the automatic skid control operation is once again initiated.

As hereinbefore noted, one feature of the present invention is that it allows the operator back into the system in the event that more pressure should be called for at the wheel cylinders. For example, if a vehicle operator is traveling on a patch of ice and desires to stop the vehicle as quickly as possible, the operator, realizing he is on ice, will engage the brake pedal only moderately in order to avoid locking the wheels and thereby causing the vehicle to skid. The skid control apparatus 1 would become operative to initiate the pumping action as hereinbefore explained. It should be noted that prior art devices have been provided which effectively block out the driver during the automatic operation of the skid control valve. Therefore, with most prior art devices, if the vehicle should pass over the patch of ice and come upon dry concrete for example, the operator would be unable to exert a greater braking force than that which he had applied while on the patch of ice since he would be blocked out of the system. However, in the exemplary embodiment of the present invention, when the wheels come upon the dry pavement they will rotate more freely and their velocity will increase to within the predetermined deviation from the wheel velocity before the brakes were applied and no potential skid condition will be detected. Therefore, the solenoid 71 will de-energize and the first and second movable piston members 43 and 45 will travel to their extreme upward position in the changeover cavity 41 causing the actuating pin 57 to open the ball valve 53, as hereinbefore explained. When the ball valve 53 opens, a fluid path from the master cylinder to the wheel cylinder is again provided and the vehicle operator may then increase the pressure of the primary fluid applied to the wheel cylinders thereby taking advantage of the increased frictional resistance of the surface underlying the wheels to brake the vehicle as quickly as possible without precipitating an uncontrollable skid.

The embodiments of the present invention in which an exclusive property or privilege is claimed are defined as follows:

1. A valve apparatus comprising:

primary input channel means arranged for connection to a primary fluid source;

means defining a changeover cavity, said primary input channel means being connected to a first end of said changeover cavity;

primary output channel means connected to said first end of said changeover cavity, said primary output channel means being arranged for connection to a utilization device;

secondary input channel means arranged for connection to a secondary fluid source;

connecting channel means for connecting said secondary input channel means with a second end of said changeover cavity;

control means between said secondary fluid source and said second end of said changeover cavity, said control means being selectively operable to vary the effective pressure of said secondary fluid within said connecting channel means between said control means and said second end of said changeover cavity thereby providing pressure-controlled secondary fluid to said second end of said changeover cavity;

a first movable piston member in said changeover cavity; and a second movable piston member in said changeover cavity separate from said first movable piston member, said first movable piston member being movable in response to the pressure exerted thereon by the primary fluid and said second movable piston member, said second movable piston member being movable in response to the pressure exerted thereon by the secondary fluid and said first movable piston member, each of said first and second movable piston members being in fluid contact with only one of said primary and secondary fluids.

2. An apparatus as set forth in claim 1 and further including sealing means for sealing said second movable piston member from said primary fluid and said first movable piston member from said secondary fluid.

3. An apparatus as set forth in claim 2 wherein said sealing means includes a first sealing element on said first movable piston member for sealing said primary fluid from said second movable piston member, and a second sealing element on said second movable piston member for sealing said secondary fluid from said first movable piston member.

4. An apparatus as set forth in claim 1 wherein said primary input channel means includes a primary valve means and primary valve biasing means for biasing said primary valve means closed thereby preventing fluid flow between the primary fluid source and said first end of said changeover cavity, said apparatus further including actuating means between said primary valve means and said first movable piston member, said actuating means being operated by said first piston member to open said primary valve means when said first piston member approaches said first end of said changeover cavity.

5. The apparatus as set forth in claim 4 wherein said primary valve means comprises a ball valve and said actuating means comprises a pin member.

6. The apparatus as set forth in claim 5 wherein said pin member is an integral part of said first movable piston member.

7. An apparatus as set forth in claim 1 wherein said connecting channel means includes means defining a pressure failure cavity, a first end of said pressure failure cavity being connected to said second end of said changeover cavity, said apparatus further including source channel means connecting said secondary fluid source with a second end of said pressure failure cavity, said apparatus further including:
a failure valve means between said first and second end of said pressure failure cavity;
failure valve biasing means for biasing said failure valve means closed thereby preventing said pressure-controlled secondary fluid flow from said connecting channel means to said second end of said changeover cavity, said failure valve means being responsive to the pressure of said secondary fluid at said second end of said pressure failure cavity for overcoming said failure valve biasing means when the pressure of the secondary fluid at said secondary fluid source exceeds a predetermined value, said failure valve means being thereby opened to allow said pressure controlled secondary fluid into said second end of said changeover cavity.

8. The apparatus as set forth in claim 4 and including second primary input channel means arranged for connecting the primary fluid source to said first end of said changeover cavity, said second primary input channel means including a movable blockout valve member therein, said connecting channel means including means defining a blockout cavity between said control means and said second end of said changeover cavity, said apparatus further including:
a movable blockout piston member within said blockout cavity separating first and second portions of said blockout cavity, said connecting channel means having a fluid path through said second portion of said blockout cavity;
channel means arranged for connecting the secondary fluid source to said first portion of said blockout cavity;
coupling means for coupling said movable blockout piston member to said movable blockout valve member; and
biasing means for biasing said blockout valve member to allow primary fluid flow through said second primary input channel means, said movable blockout piston member being responsive to a predetermined difference in pressure between said secondary fluid source pressure and said pressure-controlled secondary fluid pressure for closing said blockout valve member thereby preventing said primary fluid from flowing from said primary fluid source through said second primary input channel means.

9. The apparatus as set forth in claim 8 wherein said coupling means includes a movable pin member mechanically coupling said movable blockout piston member with said movable blockout valve member.

10. The apparatus as set forth in claim 9 and further including first sealing element within said parallel primary input channel means for sealing said primary fluid from said blockout cavity, and second sealing element within said blockout cavity for sealing said secondary fluid from said parallel primary input channel means.

11. The apparatus as set forth in claim 7 wherein said control means includes means defining a control cavity having openings to said connecting channel means, said secondary input channel means and a low pressure return channel arranged for connection to a low pressure return reservoir, said apparatus further including:
a control valve within said control cavity;
a control valve biasing means for biasing said control valve in a first position blocking said low pressure return channel opening and providing a fluid path between said secondary input channel means and said connecting channel means; and
signal responsive means coupled to said control valve, said signal responsive means being responsive to an electrical signal for moving said control valve to a second position blocking said secondary input channel opening and providing a fluid path between said low pressure return channel opening and said connecting channel means.

12. The apparatus as set forth in claim 8 wherein said control means includes means defining a control cavity having openings to said connecting channel means and a low pressure return channel arranged for connection to a low pressure return reservoir, said apparatus further including:
a control valve within said control cavity;
a control valve biasing means for biasing said control valve in a first position blocking said low pressure return channel opening and providing a fluid path between said secondary input channel means and said connecting channel means; and
signal responsive means coupled to said control valve, said signal responsive means being responsive to an electrical signal for moving said control valve to a second position blocking said secondary input channel opening and providing a fluid path between said low pressure return channel opening and said connecting channel means.

* * * * *